J. COTAL.
CHANGE SPEED GEAR.
APPLICATION FILED OCT. 16, 1920.
1,418,537.
Patented June 6, 1922.
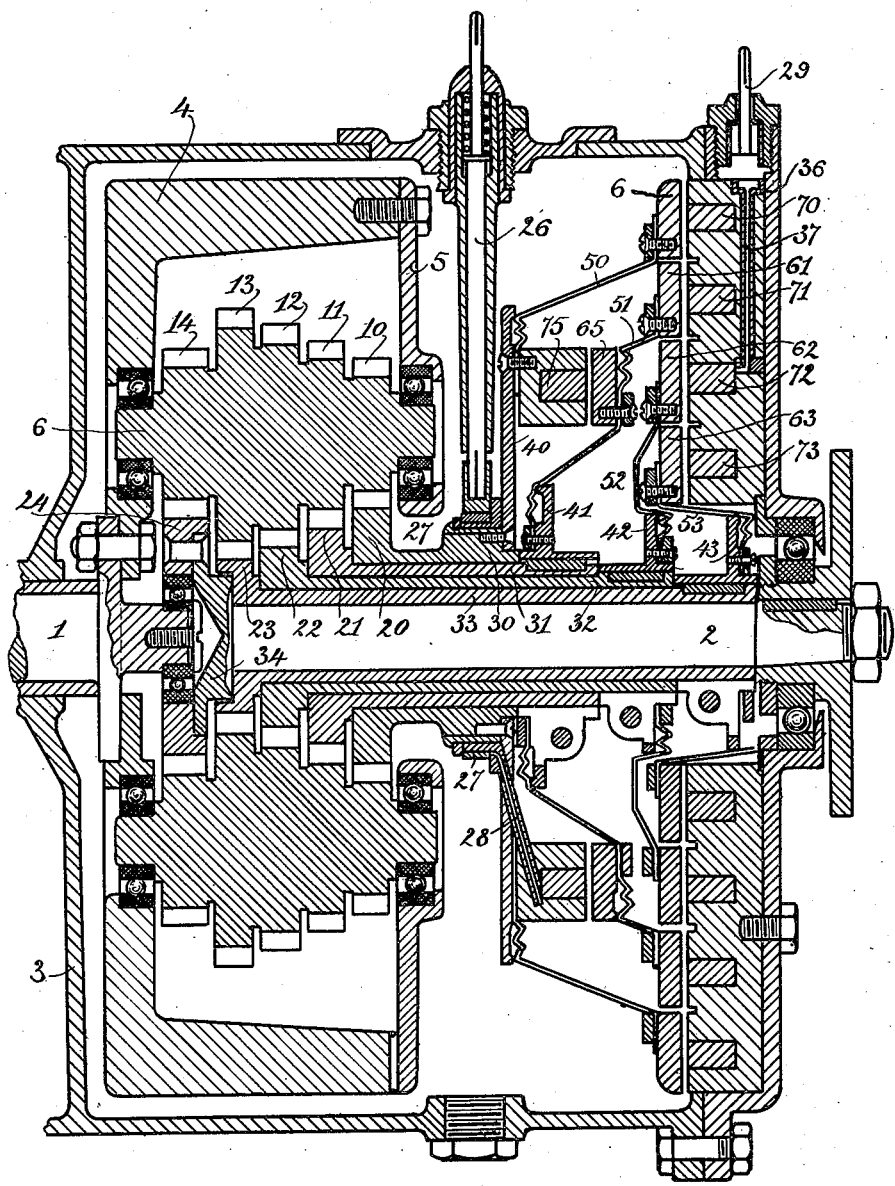

UNITED STATES PATENT OFFICE.

JEAN COTAL, OF PUTEAUX, FRANCE.

CHANGE-SPEED GEAR.

1,418,537.    Specification of Letters Patent.    Patented June 6, 1922.

Application filed October 16, 1920. Serial No. 417,419.

*To all whom it may concern:*

Be it known that I, JEAN COTAL, residing at Puteaux, France, have invented new and useful Improvements in Change-Speed Gears, of which the following is a specification.

The invention has for its object an electro-mechanical change-speed-gear which can be used in motor-cars or other machines.

The annexed drawing is a longitudinal section showing by way of example a change-speed-gear in conformity with the invention and comprising four forward speeds (the greatest one in direct coupling) and one rear speed.

The mechanism comprises a primary shaft 1, which receives the motion from the motor and a secondary shaft 2 located in the same axis as the primary shaft, transmitting after transformation the motion to the organs in which the power is used. Both shafts and the whole mechanism are mounted in a stationary casing 3.

The primary shaft has a wheel 4 keyed thereto. Between this wheel and a flange 5 fixed thereon are several shafts 6 parallel to the shaft 1 and located on the same circumference.

Each of the shafts 6 has keyed thereon the satellite-pinions 10, 11, 12, 13 and 14. These pinions gear with planetary pinions 20, 21, 22, 23, 24. These latter are keyed on concentric sleeves 30, 31, 32, 33 loose on the shaft 2 and on a plate 34 fixed on the said shaft 2.

The sleeves 30, 31, 32, 33 have plates 40, 41, 42, 43 which are connected by elastic plates 50, 51, 52, 53 respectively with concentric rims 60, 61, 62, 63. These rims are the armatures of the electro-magnets 70, 71, 72, 73 carried by the casing 3. Besides a rim 65 carried by the disc 51 is the armature of the electro-magnet 75 carried by the plate 40.

The electric current is brought to the electro-magnet 75 by the plug 26, the ring 27 and the wire 28. Each of the electro-magnets 70, 71, 72, 73 receives the current by means of similar device. The drawing shows a plug 29 touching a metallic contact 36 which feeds the electro-magnet 72 through the wire 37. The return takes place through the mass or through similar conductors.

A switch provided (or not) with a rheostat sends current in any electro-magnet.

The operation of the device is the following one:

*Out of gear.*—No electro-magnet is excited, the sleeves 30, 31, 32, 33 are loose and the satellites 14 roll on the planetary pinion 24 and the shaft 2 is not driven.

*First speed.*—The current is brought to the electro-magnet 71 which stops the armature 61 and consequently the sleeve 31 and the planetary 21. The satellites 11 roll on the planetary 21 and therefore the satellite blocks turn on themselves. Owing to the gear 14, 24, this rotation gives to the shaft 2 a component speed directed rearward while the motion of the shafts 6 around the shaft 1 transmits to the shaft 2 a component speed equal to the speed of the shaft 1 and in the same direction. As the pinion 11 is a little greater than the pinion 14 the forward component prevails over the rear component and the shaft 2 turns at a reduced speed in the same direction as the shaft 1.

*Second speed.*—The current is brought to the electro-magnet 72 which stops the armature 62, the sleeve 32 and the planetary pinion 22. As the satellites 12 are greater than the satellites 11, the shafts 6 turn on themselves at a smaller speed than in the preceding case. The rear component which results therefrom for the shaft 2 is smaller than previously and as the forward component due to the motion of shafts 6 around the shaft 1 is always the same, the shaft 2 has a motion in the same direction as the shaft 1 and at a greater speed than in the preceding case.

*Third speed.*—The electro-magnet 73 is excited and consequently the armature 63 is stopped together with the sleeve 33 and the planetary pinion 23.

As the satellites 13 are greater than the satellites 12, the shafts 6 turn on themselves slower than in the preceding case. The corresponding rear component is smaller and the shaft 2 is driven forward at a reduced speed, this latter being greater than in both preceding cases.

*Direct driving.*—The current is brought to the plug 26 and consequently the electro-magnet 75 is excited. The armature 65 is attracted and the sleeves 30 and 31 are consolidated with the planetary pinions 20 and 21. As the wheels 10 and 11 are keyed on the same shaft, the satellite block is prevented from turning on itself. It remains stationary on the wheel 4 and the satellite 14 drives the pinion 24 as a chuck would do. Consequently the secondary shaft 2 is driven at the same speed as the primary shaft. The mechanism acts as a clutch and realizes a direct coupling.

*Rear driving.*—The electro-magnet 70 is excited; it attracts the armature 60 and stops it. Consequently the sleeve 30 and the planetary pinion 20 are stopped. The pinion 10 rolls on the planetary pinion 20 and the shafts 6 rotate on themselves and they are at the same time driven by the shaft 1 around their geometrical axis. As the pinions 14 are larger than the pinions 10, the forward component speed due to the motion of the shafts 6 around the shaft 1 is smaller than the rear component due to the rotation of the shafts 6 on themselves and the shaft 2 turns at a reduced speed in a direction contrary to the sense of rotation of the primary shaft 1.

The invention is not restricted to the device represented on the drawing. If the number of satellites keyed on each of the shafts 6 is increased or diminished, the number of speeds in forward or rearward direction is modified at will.

Besides if the change speed gear is moved by means of a belt, it is possible to give to the fly wheel 4 the form of a pulley which this belt drives.

The discs 50, 51, 52, 53 formed by sheets of elastic metal and allowing a slight motion of the armatures may be superseded by any other equivalent devices such as rigid plates bearing keys and springs.

In order to obtain a gentle gearing it is possible to cut out the teeth obliquely with regard to the generating lines of the primitive cylinders.

Claims:

1. A change speed gear comprising a driving shaft, a driven shaft in line therewith, a plurality of planet gears of unequal diameter mounted in bearings carried by the driving shaft, a gear fast to the driven shaft and engaging one of the planet gears, a plurality of tubular shafts on the driven shaft, and each having a sun gear engaging one of the planet gears, and also each having an armature ring, one of said tubular shafts also having a second armature ring, fixed electro-magnets arranged to attract the first named armature rings, and an electro-magnet carried by one of the tubular shafts and arranged to attract the second armature ring.

2. A change speed gear comprising a driving shaft, a driven shaft in line therewith, a plurality of planet gears of unequal diameter mounted in bearings carried by the driving shaft, a gear fast to the driven shaft and engaging one of the planet gears, a plurality of tubular shafts on the driven shaft, and each having a sun gear engaging one of the planet gears, and also having an armature ring, elastic metal plates connecting said armature rings to said tubular shafts, and relatively fixed electromagnets arranged to attract said armature rings unless magnetized.

In witness whereof I affix my signature.

JEAN COTAL.